(12) United States Patent
Guim Bernat et al.

(10) Patent No.: US 11,431,648 B2
(45) Date of Patent: Aug. 30, 2022

(54) TECHNOLOGIES FOR PROVIDING ADAPTIVE UTILIZATION OF DIFFERENT INTERCONNECTS FOR WORKLOADS

(71) Applicant: Intel Corporation, Santa Clara, CA (US)

(72) Inventors: Francesc Guim Bernat, Barcelona (ES); Kshitij Doshi, Tempe, AZ (US); Suraj Prabhakaran, Aachen (DE)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 16/004,542

(22) Filed: Jun. 11, 2018

(65) Prior Publication Data
US 2019/0379613 A1 Dec. 12, 2019

(51) Int. Cl.
*H04L 12/927* (2013.01)
*H04L 12/24* (2006.01)
(Continued)

(52) U.S. Cl.
CPC ........ *H04L 47/805* (2013.01); *H04L 41/5009* (2013.01); *H04L 47/726* (2013.01);
(Continued)

(58) Field of Classification Search
CPC ............. H04L 12/1435; H04L 41/0896; H04L 41/5009; H04L 43/0858; H04L 43/087;
(Continued)

(56) References Cited

U.S. PATENT DOCUMENTS 6,778,495 B1 * 8/2004 Blair ............... H04L 47/125
370/230
7,050,555 B2 * 5/2006 Zargham ............ H04Q 3/66
379/112.01

(Continued)

FOREIGN PATENT DOCUMENTS

CN 104246652 A * 12/2014 ........... G06F 1/3203
CN 104246652 B * 7/2018 ........... G06F 1/3203
(Continued)

OTHER PUBLICATIONS

Weber et al., A Quality-of-Service Mechanism for Interconnection Networks in System-On-Chips, Mar. 7, 2005, Proceedings of the Design, Automation and Test in Europe Conference and Exhibition (DATE '05), IEEE, DOI: 10.1109/DATE.2005.33 (Year: 2005).*
(Continued)

*Primary Examiner* — Eric Nowlin
(74) *Attorney, Agent, or Firm* — Compass IP Law PC

(57) ABSTRACT

Technologies for providing adaptive utilization of different interconnects for workloads include a compute device. The compute device includes a connection abstraction logic unit to determine a quality of service target to be satisfied in the execution of a workload that is to communicate with at least one other workload through one or more interconnects of a set of interconnects associated with the compute device, determine a quality of service property of each interconnect of the set of interconnects, and allocate, as a function of the determined quality of service property of each interconnect, one or more of the set of interconnects to the workload to satisfy the quality of service target. The compute device also includes circuitry to execute the workload and communicate with the at least one other workload through the allocated one or more interconnects. Other embodiments are also described and claimed.

30 Claims, 5 Drawing Sheets

(51) Int. Cl.
| | |
|---|---|
| *H04L 29/08* | (2006.01) |
| *H04L 12/911* | (2013.01) |
| *H04L 12/14* | (2006.01) |
| *H04L 12/26* | (2006.01) |
| *H04L 47/80* | (2022.01) |
| *H04L 41/5009* | (2022.01) |
| *H04L 67/1031* | (2022.01) |
| *H04L 47/726* | (2022.01) |
| *H04L 43/0852* | (2022.01) |
| *H04L 43/0888* | (2022.01) |
| *H04L 43/087* | (2022.01) |

(52) U.S. Cl.
CPC ...... *H04L 67/1031* (2013.01); *H04L 12/1435* (2013.01); *H04L 43/087* (2013.01); *H04L 43/0858* (2013.01); *H04L 43/0888* (2013.01)

(58) Field of Classification Search
CPC ............. H04L 43/0876; H04L 43/0882; H04L 43/0888; H04L 45/00; H04L 45/123; H04L 45/125; H04L 45/22; H04L 45/24; H04L 45/245; H04L 47/122; H04L 47/125; H04L 47/726; H04L 47/805; H04L 67/1031
See application file for complete search history.

(56) References Cited

U.S. PATENT DOCUMENTS

| | | | | |
|---|---|---|---|---|
| 7,768,909 | B1* | 8/2010 | Parlamas | H04L 47/10 370/229 |
| 8,203,954 | B1* | 6/2012 | Patel | H04L 45/04 370/235 |
| 8,228,804 | B2* | 7/2012 | Ninan | H04L 45/22 370/238 |
| 8,316,171 | B2 | 11/2012 | Boucard et al. | |
| 8,917,724 | B2* | 12/2014 | Thyni | H04L 49/30 370/389 |
| 9,071,541 | B2* | 6/2015 | Atlas | H04L 45/24 |
| 9,256,268 | B2* | 2/2016 | Wang | G06F 1/3203 |
| 9,542,346 | B2* | 1/2017 | Hrischuk | G06F 11/3452 |
| 9,602,380 | B2* | 3/2017 | Strassner | H04L 43/0888 |
| 9,619,006 | B2* | 4/2017 | Samih | G06F 1/325 |
| 9,722,928 | B2* | 8/2017 | Patel | H04L 43/0864 |
| 9,769,050 | B2 | 9/2017 | Herdrich et al. | |
| 9,769,070 | B2* | 9/2017 | Basunov | H04L 45/302 |
| 9,870,330 | B2* | 1/2018 | Faulkner | G06F 3/0605 |
| 9,998,399 | B2* | 6/2018 | Dunbar | H04L 47/827 |
| 10,009,292 | B2* | 6/2018 | Dunbar | H04L 47/76 |
| 10,237,201 | B2* | 3/2019 | Kelly | H04L 67/1097 |
| 10,721,651 | B2* | 7/2020 | Mittal | H04L 45/7453 |
| 2003/0055971 | A1* | 3/2003 | Menon | H04L 67/101 709/226 |
| 2003/0229613 | A1* | 12/2003 | Zargham | H04Q 3/66 |
| 2005/0243726 | A1* | 11/2005 | Narendran | H04L 47/822 370/238 |
| 2006/0120282 | A1* | 6/2006 | Carlson | H04L 47/805 370/229 |
| 2006/0165009 | A1* | 7/2006 | Nguyen | H04L 45/04 370/252 |
| 2007/0100776 | A1* | 5/2007 | Shah | G06Q 30/0283 705/400 |
| 2008/0301696 | A1* | 12/2008 | Tantawi | G06F 11/3433 718/105 |
| 2012/0008503 | A1* | 1/2012 | Qiu | H04L 47/125 370/238 |
| 2012/0320914 | A1* | 12/2012 | Thyni | H04L 45/745 370/389 |
| 2014/0149766 | A1* | 5/2014 | Samih | H04L 45/127 713/320 |
| 2014/0195833 | A1* | 7/2014 | Wang | G06F 1/3203 713/320 |
| 2015/0199148 | A1* | 7/2015 | Hrischuk | G06F 3/0653 711/114 |
| 2016/0099887 | A1* | 4/2016 | Dunbar | H04L 47/827 709/226 |
| 2016/0099888 | A1* | 4/2016 | Dunbar | H04L 47/827 709/226 |
| 2016/0218971 | A1* | 7/2016 | Basunov | H04L 45/70 |
| 2016/0259742 | A1* | 9/2016 | Faulkner | G06F 11/3452 |
| 2017/0286179 | A1* | 10/2017 | Dimnaku | G06F 9/5083 |
| 2017/0346760 | A1* | 11/2017 | Kelly | H04L 67/1097 |
| 2018/0159765 | A1* | 6/2018 | Shi | H04W 40/02 |
| 2018/0241802 | A1* | 8/2018 | Bernat | H04L 67/101 |
| 2019/0068696 | A1 | 2/2019 | Sen et al. | |
| 2019/0104083 | A1* | 4/2019 | Bernat | H04L 41/5019 |
| 2019/0104438 | A1* | 4/2019 | Mittal | H04W 40/24 |
| 2019/0205745 | A1 | 7/2019 | Sridharan et al. | |
| 2019/0235922 | A1* | 8/2019 | Iovanna | H04L 67/1004 |
| 2019/0327174 | A1* | 10/2019 | LaVigne | H04L 45/22 |
| 2019/0379613 | A1* | 12/2019 | Bernat | H04W 4/24 |
| 2020/0120035 | A1* | 4/2020 | Subbiah | H04L 45/02 |
| 2020/0314692 | A1* | 10/2020 | Mittal | H04W 40/24 |
| 2021/0111958 | A1* | 4/2021 | Mahadevan | H04L 41/12 |

FOREIGN PATENT DOCUMENTS

| | | | | |
|---|---|---|---|---|
| DE | 102017223568 A1 * | 6/2019 | ......... | H04L 47/827 |
| WO | WO-2013162512 A1 * | 10/2013 | ......... | G06F 1/3253 |
| WO | WO-2015108772 A1 * | 7/2015 | ......... | G06F 3/0605 |
| WO | WO-2019120683 A1 * | 6/2019 | ............ | H04L 45/68 |

OTHER PUBLICATIONS

Briscoe et al., Commercial Models for IP Quality of Service Interconnect, Apr. 2005, BT Technology Journal, vol. 23, No. 2 (Year: 2005).*
Wissem et al., A Quality of Service Network on Chip based on a new priority arbitration mechanism, Dec. 19, 2011, International Conference on Microelectronics (ICM) 2011 Proceeding, DOI: 10.1109/ICM.2011.6177349 (Year: 2011).*
Harmanci et al., Quantitative modelling and comparison of communication schemes to guarantee quality-of-service in networks-on-chip, May 23, 2005, IEEE International Symposium on Circuits and Systems (ISCAS) 2005, DOI: 10.1109/ISCAS.2005.1464954 (Year: 2005).*
Heibwolf et al., A Scalable NoC Router Design Providing QoS Support Using Weighted Round Robin Scheduling, Jul. 10, 2012, 2012 IEEE 10th International Symposium on Parallel and Distributed Processing with Applications, DOI: 10.1109/ISPA.2012.93 (Year: 2012).*
Wang et al., Design and evaluation of a high throughput QoS-aware and congestion-aware router architecture for Network-on-Chip, Jun. 2014, Microprocessors and Microsystems, vol. 38, Issue 4, pp. 304-315, DOI: 10.1016/j.micpro.2013.09.006 (Year: 2014).*
"NoC Interconnect Improves SoC Economics Initial Investment is Low Compared to SoC Performance and Cost Benefits", Objective Analysis Semiconductor Market Research, Cpoyright 2011, 5 pages.
Matveeva, Nadezhda, et.al., "QoS support in embedded networks and NoC." Proceedings of 16th Conference of Open Innovations Association Fruct. IEEE, 2014, 9 pages.
Saadaoui, Abdelkader, et al., "End to End QoS Metrics Modeling Based on Multi-application Environment in Network on Chip", Journal of Computer Networks. vol. 4, No. 1, 2017, pp. 1-10, 10 pages.

* cited by examiner

US 11,431,648 B2

TECHNOLOGIES FOR PROVIDING ADAPTIVE UTILIZATION OF DIFFERENT INTERCONNECTS FOR WORKLOADS

BACKGROUND

Over time, the variety and number of interconnects (e.g., data communication buses, network connections, etc.) between resources on a typical compute device (e.g., components of compute devices, such as processors, memory, accelerator devices, storage device, etc.) and between compute devices (e.g., Ethernet connections, optical fiber connections, etc. between compute devices in a data center) has continued to grow. Each type of interconnect has a set of communication properties that define the quality of service (e.g., latency, bandwidth, jitter, bit error rate, etc.) that the interconnect is capable of providing at a particular monetary cost (e.g., based on the manufacturing cost of the interconnect). Further, compute devices may execute different workloads (e.g., applications) that may communicate with each other through one or more of the interconnects to achieve a goal, such as to distributively train an artificial intelligence model, to make inferences using the trained artificial intelligence model, to perform cryptographic operations, etc. Each type of workload may have different quality of service targets to be satisfied. For example, some workload types may have relatively less demanding latency targets and relatively more demanding bandwidth targets, while other workload types may have relatively more demanding latency targets and less demanding bandwidth targets. Typically, a choice as to the interconnects available for communication between workloads is made statically and any changes in the quality of service targets for the workloads executed on the corresponding compute devices(s) may lead to inefficiencies (e.g., delays, over provisioning of communication capabilities, etc.) in the data center.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
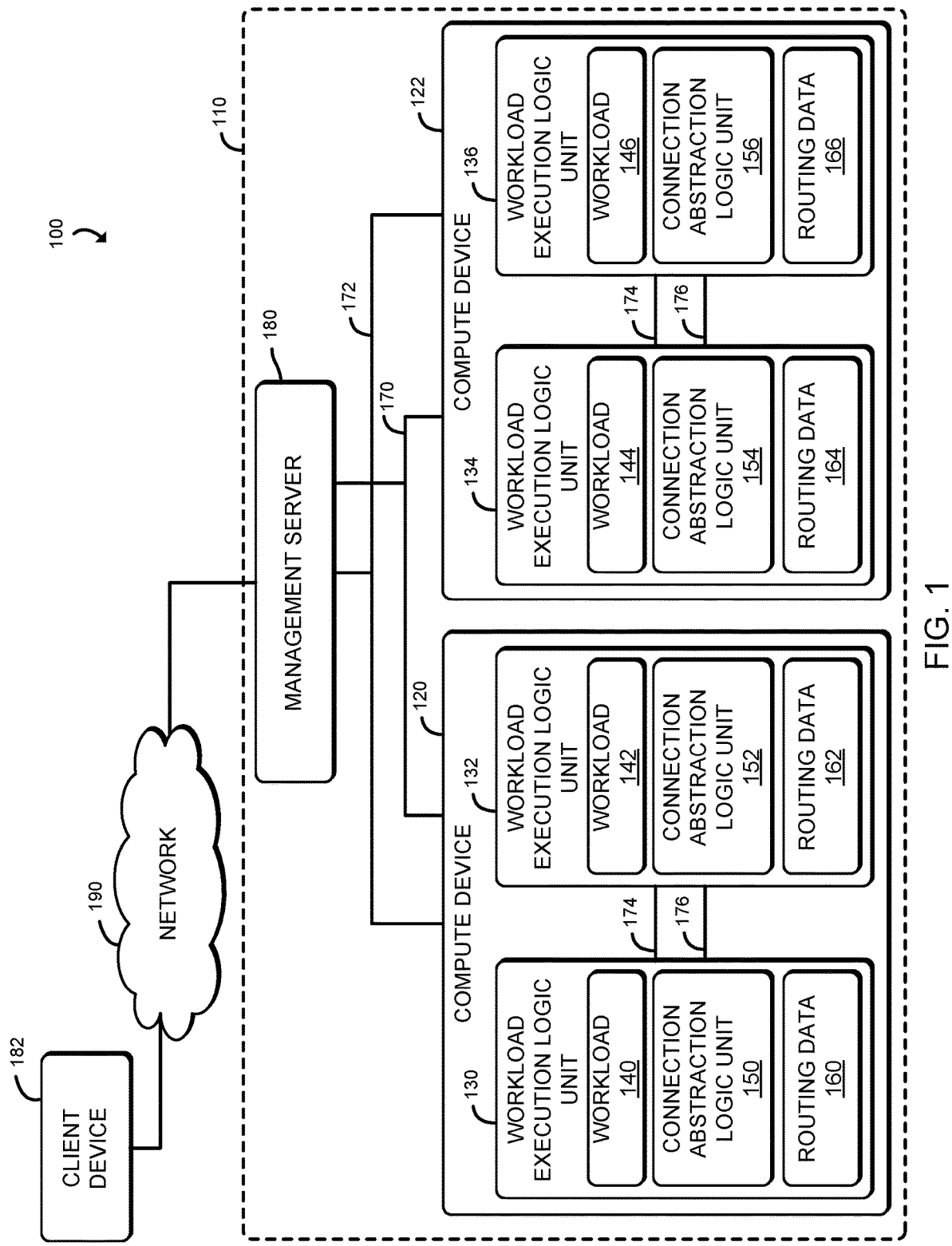
FIG. 1 is a simplified diagram of at least one embodiment of a system for providing adaptive utilization of different interconnects for workloads in a data center.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for providing adaptive utilization of different interconnects (e.g., physical or logical connections between electronic devices or networks) for workloads includes a data center 110, such as a cloud data center, in which a management server 180 is in communication with a set of compute devices 120, 122 (e.g., to manage the assignment of workloads to the compute devices 120, 122). Each compute device 120, 122, in operation, may execute one or more workloads 140, 142, 144, 146 (e.g., applications) on behalf of a client device 182, which, in the illustrative embodiment, is in communication with the management server 180 and/or the compute devices 120, 122 through a network 190. In the illustrative embodiment, the compute devices 120, 122 execute each workload 140, 142, 144, 146 with a corresponding workload execution logic unit 130, 132, 134, 136 which may be embodied as a processor, a co-processor, a field programmable gate array (FPGA), an application specific integrated circuit (ASIC) or other device or circuitry capable of performing the operations of the workload (e.g., training an artificial intelligence model, making inferences with the artificial intelligence model, performing cryptographic operations, etc.). Further, in doing so, the workloads 140, 142, 144, 146 may communicate with each other, such as between workload execution logic units 130, 132 of one of the compute devices (e.g., the compute device 120) and/or between compute devices (e.g., from the workload execution logic unit 130 of the compute device 120 to the workload execution logic unit 134 of the compute device 122).

In the illustrative embodiment, the workloads 140, 42, 144, 146 communicate using one or more interconnects, which may include one or more internal interconnects 174, 176 each of which may be embodied as a data bus between components of the corresponding compute device (e.g., a peripheral component interconnect express (PCIe) bus, an Intel QuickPath Interconnect, etc.) and external interconnects 170, 172 each of which may be embodied as any data bus between the compute devices (e.g., Ethernet, InfiniBand, etc.). In the illustrative embodiment, each workload execution logic unit 130 includes or is coupled to a corresponding connection abstraction logic unit 150, 152, 154, 156. Each connection abstraction logic unit 150, 152, 154, 156 may be embodied as any circuitry or device (e.g., a processor, a co-processor, an FPGA, an ASIC, etc.) capable of adaptively allocating (e.g., including setting one or more routing rules in a set of routing data 160, 162, 164, 166) one or more of the available interconnects for use by the workload to communicate with one or more other workloads and, in doing so, presenting a single communication interface to the corresponding workload, regardless of the number of separate interconnects that have been allocated. As such, and as compared to typical systems, the system 100 enables dynamic rather than static allocation of the communication capacity of one or more interconnects and offloads the processing overhead of doing so from a workload, thereby enabling the workloads to potentially execute faster and reducing the likelihood that the interconnects will be under- or over-utilized in the data center 110.

Figure 2:
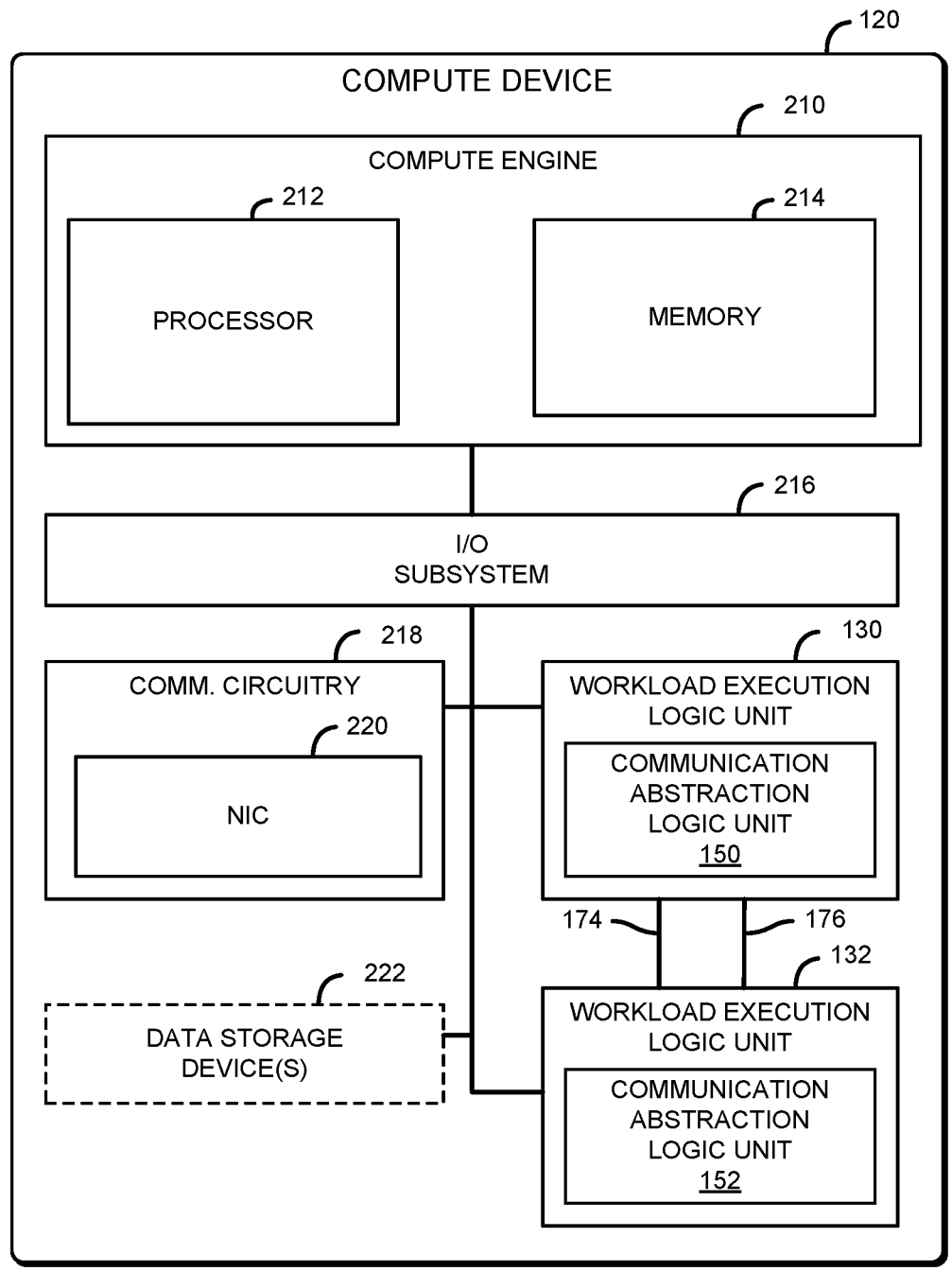
FIG. 2 is a simplified block diagram of at least one embodiment of a compute device of the system of FIG. 1.

Referring now to FIG. 2, the compute device 120 may be embodied as any type of device (e.g., a computer) capable of performing the functions described herein, including determining a quality of service target to be satisfied in the execution of a workload that is to communicate with at least one other workload through one or more interconnects, determining a quality of service property of each interconnect, allocating, as a function of the determined quality of service property of each interconnect, one or more of the interconnects to the workload to satisfy the quality of service target, executing the workload, and communicating with the at least one other workload through the allocated interconnect(s).

As shown in FIG. 2, the illustrative compute device 120 includes a compute engine 210, an input/output (I/O) subsystem 216, communication circuitry 218, the workload execution logic units 130, 132, the connection abstraction logic units 150, 152, and one or more data storage devices 222. Of course, in other embodiments, the compute device 120 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212, and a main memory 214. The processor 212 may be embodied as any type of processor capable of performing a set of functions. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein. In some embodiments, one or more of the workload execution logic units 130, 132 and/or connection abstraction logic units 150, 152 may be included in the processor 212.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as applications, programs, libraries, and drivers.

The compute engine 210 is communicatively coupled to other components of the compute device 120 via the I/O subsystem 216, which may be embodied as circuitry and/or components to facilitate input/output operations with the compute engine 210 (e.g., with the processor 212 and/or the main memory 214) and other components of the compute device 120. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the compute device 120, into the compute engine 210.

The communication circuitry 218 may be embodied as any communication circuit, device, or collection thereof, capable of enabling communications over the network 190 between the compute device 120 and another compute device (e.g., the compute device 122, the management server 180, the client device 182, etc.). The communication circuitry 218 may be configured to use any one or more communication technology (e.g., wired or wireless communications) and associated protocols (e.g., Ethernet, Infini-Band, Bluetooth®, Wi-Fi®, WiMAX, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the compute device 120 to connect with another compute device (e.g., the compute device 122, the management server 180, the client device 182, etc.) through one or more external interconnects (e.g., the interconnects 170, 172). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the compute device 120 at the board level, socket level, chip level, and/or other levels.

The workload execution logic units 130, 132 and the connection abstraction logic units 150, 152 are described above with reference to FIG. 1. The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

The compute device 122, the management server 180, and the client device 182 may have components similar to those described in FIG. 1 with reference to the compute device 120. The description of those components of the compute device 120 is equally applicable to the description of components of the compute device 122, the management server 180, and the client device 182 and is not repeated herein for clarity of the description. Further, it should be appreciated that any of the compute devices 120, 122, the management server 180, and the client device 182 may include other components, sub-components, and devices commonly found in a computing device, which are not discussed above in reference to the compute device 120 and not discussed herein for clarity of the description.

As described above, the compute devices 120, 122, the management server 180, and the client device 182 are illustratively in communication via the network 190, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
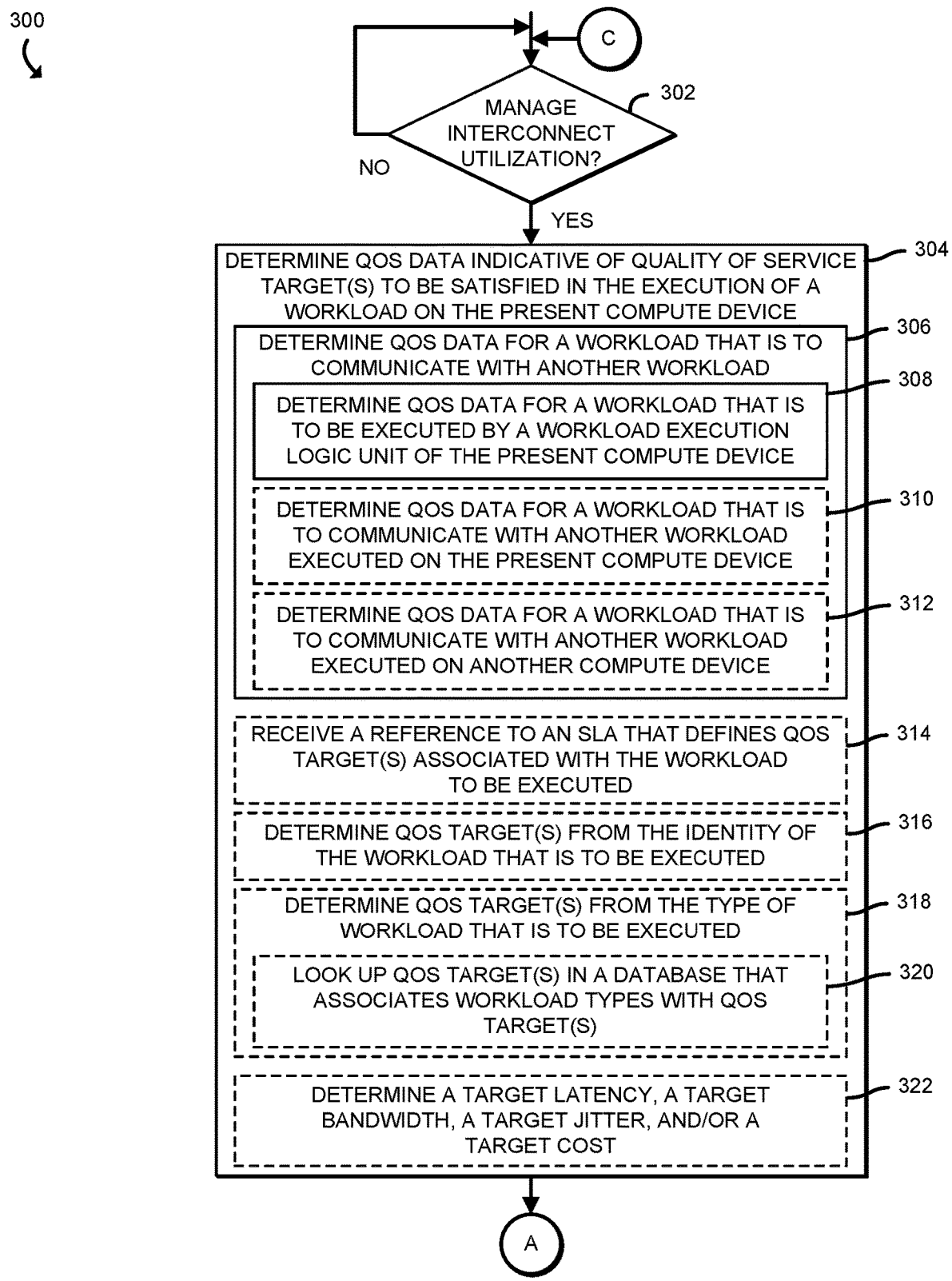
FIGS. 3-5 are a simplified block diagram of at least one embodiment of a method for providing adaptive utilization of different interconnects for workloads that may be performed by the compute device of FIGS. 1-2.

Referring now to FIG. 3, the compute device 120, in operation, may execute a method 300 providing adaptive utilization of different interconnects for workloads. The method 300 begins with block 302, in which the compute device 120 determines whether to adaptively manage interconnect utilization. In doing so, and in the illustrative embodiment, the compute device 120 determines to manage interconnect utilization if the compute device 120 is equipped with one or more connection abstraction logic units (e.g., the connection abstraction logic units 150, 152) and in response to receiving a request from a workload (e.g., the workload 140) that is to be executed on the compute device 120 to establish communication with another workload (e.g., one or more of the workloads 142, 144, 146). In other embodiments, the compute device 120 may make the determination based on other factors. Regardless, in response to a determination to adaptively manage interconnect utilization, the method 300 advances to block 304 in which the compute device 120 determines quality of service data indicative of one or more quality of service targets (e.g., a target latency, a target bandwidth, a target jitter, etc.) to be satisfied in the execution of the workload (e.g., the workload 140) on the compute device 120. In doing so, and as indicated in block 306, the compute device 120 determines quality of service data for a workload (e.g., the workload 140) that is to communicate with another workload 142, 144, 146. In the illustrative embodiment, and as indicated in block 308, the compute device 120 may determine quality of service data for a workload (e.g., the workload 140) that is to be executed by a workload execution logic unit (e.g., the workload execution logic unit 130) of the compute device 120. As indicated in block 310, the compute device 120 may determine quality of service data for a workload (e.g., the workload 140) that is to communicate with another workload (e.g., the workload 142) executed on the compute device 120 and/or with another workload executed on another compute device 122 (e.g., the workloads 144, 146), as indicated in block 312.

To determine the quality of service data, the compute device 120 may receive (e.g., in the request from the workload 140) a reference to a service level agreement that defines quality of service targets associate with the workload 140, as indicated in block 314. The service level agreement may be stored locally on the compute device 120 (e.g., in the memory 214 or a data storage device 222) and/or may be stored at another source (e.g., the management server 180) for access by the compute device 120. Alternatively, the compute device 120 may determine the quality of service targets from the identity of the workload 140 (e.g., by reading a data set that associates identifiers of workloads with corresponding quality of service targets to be satisfied), as indicated in block 316. In some embodiments, the compute device 120 may determine the quality of service targets from the type of the workload 140 that is to be executed, as indicated in block 318. For example, the request from the workload 140 may include data that indicates the type of the workload, or the compute device 120 may read a data structure that associates workload identifiers with workload types, or may request data indicative of the workload type from the management server 180. Regardless of how the compute device 120 determines the workload type, the compute device 120 may subsequently look up the quality of service targets in a data structure that associates workload types with quality of service targets, as indicated in block 320. In determining the quality of service targets, the compute device 120 may determine a target latency (e.g., a latency that is not to be exceeded), a target bandwidth, a target jitter, and a target monetary cost of using the interconnect(s), as indicated in block 322. Subsequently, the method 300 advances to block 324 of FIG. 4, in which the compute device 120 determines properties of interconnects (e.g., included in and connected to) the compute device 120.

Figure 4:
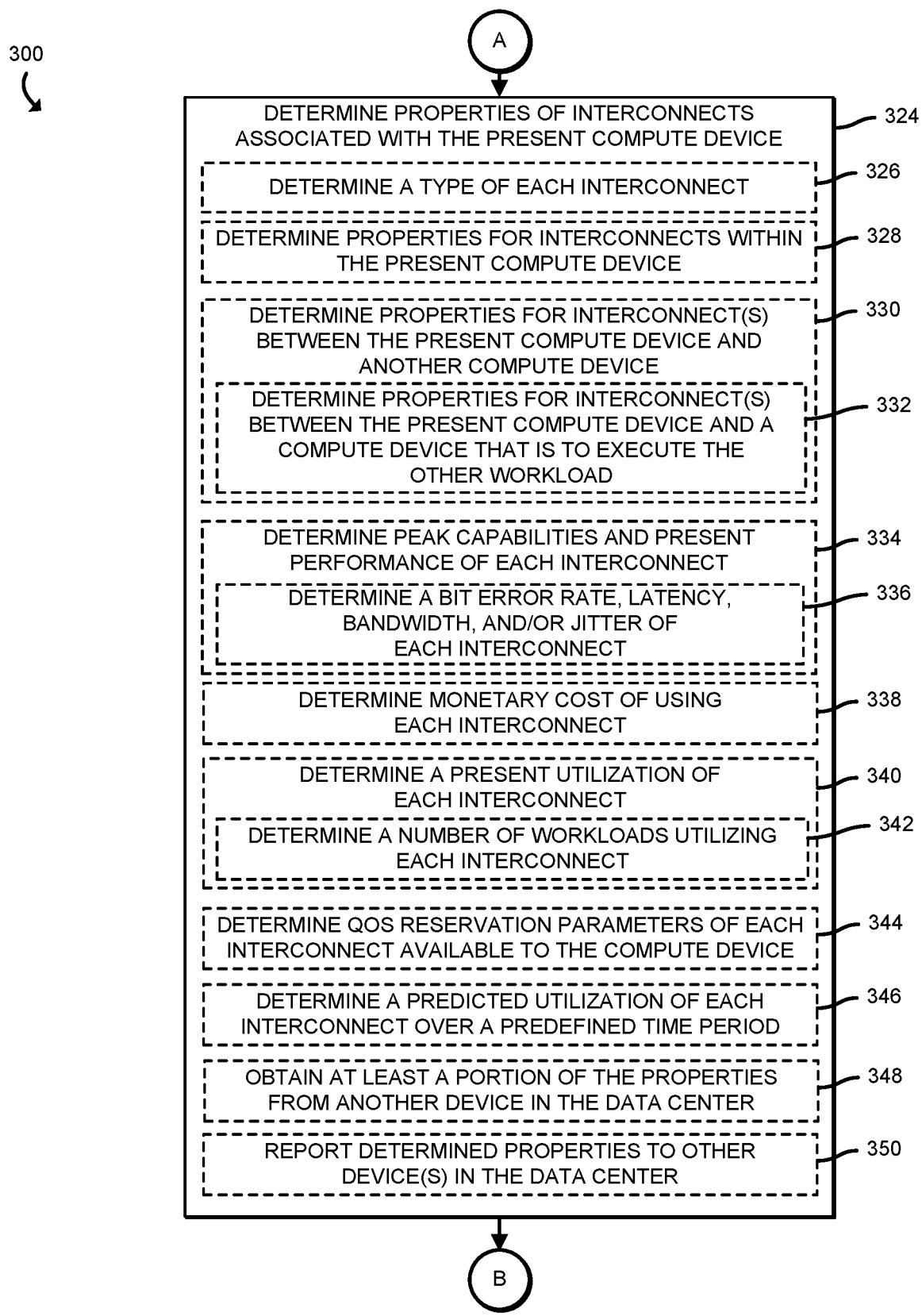

Referring now to FIG. 4, in determining the properties of interconnects associated with the compute device 120, in the illustrative embodiment, the compute device 120 determines a type of each interconnect (e.g., by reading one or more memory regions in which data indicative of the available interconnects and their types is present, by querying one or more controller hubs and/or the communication circuitry 218, etc.), as indicated in block 326. As indicated in block 328, the compute device 120, in the illustrative embodiment, determines properties (e.g., latency, bandwidth, error rate, etc.), for interconnects within the compute device 120 (e.g., the internal interconnects 174, 176), such as by reading a data structure (e.g., the routing data 160) that associates internal interconnect types or identifiers with a set of properties. As indicated in block 330, the compute device 120 may determine properties for interconnects (e.g., the external interconnects 170, 172) between the compute device 120 and another compute device (e.g., the compute device 122), such as by reading a data structure (e.g., the routing data 160) that associates external interconnect types or identifiers with a set of properties. For example, and as indicated in block 332, the compute device 120 may determine properties for interconnects between the compute device 120 and a compute device (e.g., the compute device 122) that is to execute another workload (e.g., the workloads 144, 146) that the workload 140 is to communicate with.

As indicated in block 334, the compute device 120 may determine peak capabilities (e.g., theoretical performance computed based on architecture) and a present performance of each interconnect. In doing so, and as indicated in block 336, the compute device 120 may determine the present and/or the peak bandwidth, latency, bit error rate, and/or a jitter of each interconnect. As indicated in block 338, the compute device 120 may determine a cost (e.g., a monetary cost, which may be defined in dollars per unit of time, dollars per a predefined amount of data, etc.) of utilizing each interconnect. Such costs may be defined in a data structure (e.g., the routing data 160) maintained on the compute device 120 and/or at another source (e.g., the management server 180). As indicated in block 340, the compute device 120 may determine a present utilization of each interconnect. In doing so, and as indicated in block 342, the compute device 120 may determine a number of workloads utilizing each interconnect. As indicated in block 344, the compute device 120 may determine quality of service reservation parameters of each interconnect. In the illustrative embodiment, the quality of service reservation parameters are each embodied as a parameter (e.g., exposed by a controller associated with the interconnect) that, when set, causes the corresponding interconnect to allocate enough capacity to a workload to provide, for the workload, a minimum bandwidth, a maximum latency, or other quality of service metric. As indicated in block 346, the compute device 120 may determine a predicted utilization of each interconnect over a predefined time period (e.g., by combining the quality of service targets of each workload that is utilizing a given interconnect or that has been allocated a portion of the capacity of a given interconnect for future use). In determining the properties and as mentioned above, the compute device 120 may obtain at least a portion of the properties from another device in the data center (e.g., from the management server 180, from another compute device 122, etc.), as indicated in block 348. Further, as indicated in block 350, the compute device 120 may report one or more determined properties to one or more other devices in the data center 110. In some embodiments, each connection abstraction logic unit 150, 152, 154, 156 may locally populate a data set (e.g., the corresponding routing data 160, 162, 164, 166) based on properties determined by the connection abstraction logic unit 150, 152, 154, 156 and share the data with the other connection abstraction logic units 150, 152, 154, 156 (e.g., continually synchronizing the routing data 160, 162, 164, 166). Subsequently, the method 300 advances to block 352 of FIG. 5, in which the compute device 120 allocates, as a function of the determined quality of service properties, a set of the interconnects to the workload (e.g., the workload 140) to satisfy the quality of service targets.

Figure 5:
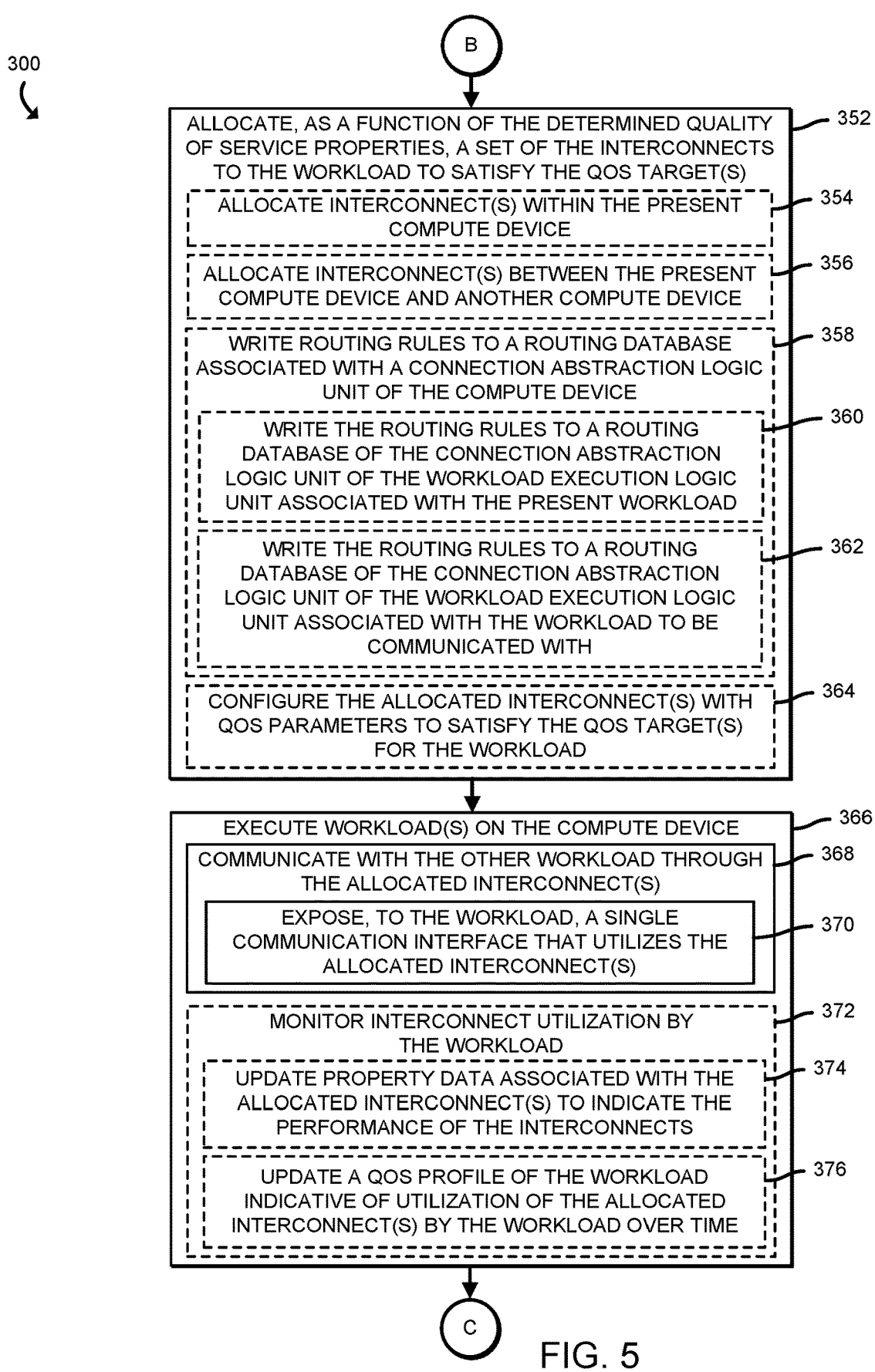

Referring now to FIG. 5, in allocating the set of interconnects, the compute device 120 may allocate one or more interconnects within the compute device 120 (e.g., one or more of the internal interconnects 174, 176), as indicated in block 354. For example, the compute device 120 may allocate one or more of the interconnects 174, 176 to enable communication between the workloads 140, 142 within the compute device 120. Additionally or alternatively, the compute device 120 may allocate one or more interconnects between the compute device 120 and another compute device 122, as indicated in block 356. For example, the compute device 120 may allocate one or more of the external interconnects 170, 172 to enable communication between the workload 140 and one or more of the workloads 144, 146 executed by the compute device 122. In allocating the interconnect(s), in the illustrative embodiment, the compute device 120 writes routing rules to a routing data structure (e.g., the routing data 160) associated with a connection abstraction logic unit (e.g., the connection abstraction logic unit 150) of the compute device 120, as indicated in block 358. In the illustrative embodiment, the routing rules identify the workload, the interconnects allocated to the workload, and meta-data associated with the interconnect, such as performance properties of the interconnect and/or parameters usable to reserve a specified quality of service from the interconnect. As indicated in block 360, the compute device 120, in the illustrative embodiment, writes the routing rules to a routing data structure (e.g., the routing data 160) of the connection abstraction logic unit (e.g., the connection abstraction logic unit 150) of the workload execution logic unit 130 associated with the workload 140. As indicated in block 362, the compute device 120 may additionally write the routing rules to a routing data structure (e.g., the routing data 162) of the connection abstraction logic unit associated with the workload to be communicated with (e.g., the connection abstraction logic unit 152 for the workload 142). In the illustrative embodiment, and as indicated in block 364, the compute device 120 configures the allocated interconnect(s) with one or more quality of service parameters to satisfy the quality of service target(s) of the workload (e.g., the workload 140). In writing the routing rules, in the illustrative embodiment, the compute device 120 defines a path between the workloads 130, 132 executed on the compute device 120 and any workloads (e.g., the workloads 130, 132, 134, 136) that are to be communicated with, thereby enabling a given workload (e.g., the workload 140) to simply request (e.g., to the connection abstraction logic unit 150 through an API) that a particular message be sent to an identified workload (e.g., the workload 134) without specifying the location of the workload (e.g., the compute device 122, the workload execution logic unit 134, an internet protocol (IP) address, a media access control (MAC) address, etc.) to send the message to the target workload. As described above, in the illustrative embodiment, the workloads 130, 132, 134, 136 may be related to artificial intelligence (e.g., AI models), which may communicate with each other to perform training and/or inference operations.

Subsequently, in block 366, the compute device 120 executes the workload 140 and any other workloads assigned to the compute device 120 (e.g., the workload 142). In doing so, and as indicated in block 368, the compute device 120 communicates (e.g., through the connection abstraction logic unit 150) on behalf of the workload 140 with one or more other workloads through the allocated interconnects. In the illustrative embodiment, the compute device 120 exposes, to the workload 140 (e.g., using the connection abstraction logic unit 150), a single communication interface that utilizes the allocated interconnect(s), as indicated in block 370. In block 372, the compute device 120 may monitor interconnect utilization of the workload 140. In doing so, the compute device 120 may update property data associated with the allocated interconnect(s) (e.g., in the routing data 160) to indicate the performance of the allocated interconnects, as indicated in block 374. The compute device 120 may also update a quality of service profile associated with the workload 140 that indicates the utilization of the allocated interconnects by the workload over time (e.g., to indicate a changing utilization over time and to assist with prediction of interconnect utilization by the workload or workloads of the same type in the future), as indicated in block 376. Subsequently, the method 300 loops back to block 302 of FIG. 3 to determine whether to continue to manage interconnect utilization.

EXAMPLES

Illustrative examples of the technologies disclosed herein are provided below. An embodiment of the technologies may include any one or more, and any combination of, the examples described below.

Example 1 includes a compute device comprising a connection abstraction logic unit configured to (i) determine a quality of service target to be satisfied in the execution of a workload that is to communicate with at least one other workload through one or more interconnects of a plurality of interconnects associated with the compute device; (ii) determine a quality of service property of each interconnect of the plurality of interconnects; and (iii) allocate, as a function of the determined quality of service property of each interconnect, one or more of the plurality of interconnects to the workload to satisfy the quality of service target; and circuitry configured to execute the workload and communicate with the at least one other workload through the allocated one or more interconnects.

Example 2 includes the subject matter of Example 1, and wherein the connection abstraction logic unit is further configured to allocate multiple of the plurality of interconnects and expose, to the workload, a single communication interface to utilize the allocated interconnects.

Example 3 includes the subject matter of any of Examples 1 and 2, and wherein the connection abstraction logic unit is further configured to receive a reference to a service level agreement (SLA) associated with the workload, wherein the SLA defines one or more quality of services targets.

Example 4 includes the subject matter of any of Examples 1-3, and wherein the connection abstraction logic unit is further configured to determine the quality of service target as a function of an identity of the workload that is to be executed.

Example 5 includes the subject matter of any of Examples 1-4, and wherein the connection abstraction logic unit is further configured to determine the quality of service target as a function of a type of the workload that is to be executed.

Example 6 includes the subject matter of any of Examples 1-5, and wherein the connection abstraction logic unit is further configured to determine at least one of a target latency, a target bandwidth, a target jitter, or a target monetary cost as the quality of service target.

Example 7 includes the subject matter of any of Examples 1-6, and wherein the connection abstraction logic unit is further configured to determine a quality of service target for a workload that is to communicate with another workload on the present compute device.

Example 8 includes the subject matter of any of Examples 1-7, and wherein the connection abstraction logic unit is further configured to determine a quality of service target for a workload that is to communicate with another workload on another compute device.

Example 9 includes the subject matter of any of Examples 1-8, and wherein the connection abstraction logic unit is further configured to determine one or more parameters of each interconnect that are available to be set by the compute device to reserve a quality of service for the workload.

Example 10 includes the subject matter of any of Examples 1-9, and wherein the connection abstraction logic unit is further configured to determine a peak communication capability of each interconnect.

Example 11 includes the subject matter of any of Examples 1-10, and wherein the connection abstraction logic unit is further configured to determine at least one of a monetary cost to use each interconnect, a bit error rate of each interconnect, or a present utilization of each interconnect.

Example 12 includes the subject matter of any of Examples 1-11, and wherein the connection abstraction logic unit is further configured to determine a predicted utilization of each interconnect over a predefined time period.

Example 13 includes the subject matter of any of Examples 1-12, and wherein the connection abstraction logic unit is further configured to write a set of routing rules to a routing data structure that associates an identifier of each allocated interconnect with an identifier of the workload.

Example 14 includes the subject matter of any of Examples 1-13, and wherein the connection abstraction logic unit is further configured to configure the one or more allocated interconnects with one or more quality of service reservation parameters.

Example 15 includes one or more machine-readable storage media comprising a plurality of instructions stored thereon that, in response to being executed, cause a compute device to determine a quality of service target to be satisfied in the execution of a workload that is to communicate with at least one other workload through one or more interconnects of a plurality of interconnects associated with the compute device; determine a quality of service property of each interconnect of the plurality of interconnects; allocate, as a function of the determined quality of service property of each interconnect, one or more of the plurality of interconnects to the workload to satisfy the quality of service target; and execute the workload and communicate with the at least one other workload through the allocated one or more interconnects.

Example 16 includes the subject matter of Example 15, and wherein the plurality of instructions further cause the compute device to allocate multiple of the plurality of interconnects and expose, to the workload, a single communication interface to utilize the allocated one or more interconnects.

Example 17 includes the subject matter of any of Examples 15 and 16, and wherein the plurality of instructions further cause the compute device to receive a reference to a service level agreement (SLA) associated with the workload, wherein the SLA defines one or more quality of services targets.

Example 18 includes the subject matter of any of Examples 15-17, and wherein the plurality of instructions further cause the compute device to determine the quality of service target as a function of an identity of the workload that is to be executed.

Example 19 includes the subject matter of any of Examples 15-18, and wherein the plurality of instructions further cause the compute device to determine the quality of service target as a function of a type of the workload that is to be executed.

Example 20 includes the subject matter of any of Examples 15-19, and wherein the plurality of instructions further cause the compute device to determine at least one of a target latency, a target bandwidth, a target jitter, or a target monetary cost as the quality of service target.

Example 21 includes the subject matter of any of Examples 15-20, and wherein the plurality of instructions further cause the compute device to determine a quality of service target for a workload that is to communicate with another workload on the present compute device.

Example 22 includes the subject matter of any of Examples 15-21, and wherein the plurality of instructions further cause the compute device to determine a quality of service target for a workload that is to communicate with another workload on another compute device.

Example 23 includes the subject matter of any of Examples 15-22, and wherein the plurality of instructions further cause the compute device to determine one or more parameters of each interconnect that are available to be set by the compute device to reserve a quality of service for the workload.

Example 24 includes the subject matter of any of Examples 15-23, and wherein the plurality of instructions further cause the compute device to determine a peak communication capability of each interconnect.

Example 25 includes the subject matter of any of Examples 15-24, and wherein the plurality of instructions further cause the compute device to determine at least one of a monetary cost to use each interconnect, a bit error rate of each interconnect, or a present utilization of each interconnect.

Example 26 includes a compute device comprising circuitry for determining a quality of service target to be satisfied in the execution of a workload that is to communicate with at least one other workload through one or more interconnects of a plurality of interconnects associated with the compute device; circuitry for determining a quality of service property of each interconnect of the plurality of interconnects; means for allocating, as a function of the determined quality of service property of each interconnect, one or more of the plurality of interconnects to the workload to satisfy the quality of service target; and circuitry for executing the workload and communicating with the at least one other workload through the allocated one or more interconnects.

Example 27 includes a method comprising determining, by a connection abstraction logic unit of a compute device, a quality of service target to be satisfied in the execution of a workload that is to communicate with at least one other workload through one or more interconnects of a plurality of interconnects associated with the compute device; determining, by the connection abstraction logic unit of the compute device, a quality of service property of each interconnect of the plurality of interconnects; allocating, by the connection abstraction logic unit of the compute device and as a function of the determined quality of service property of each interconnect, one or more of the plurality of interconnects to the workload to satisfy the quality of service target; and executing, by the compute device, the workload and communicating with the at least one other workload through the allocated one or more interconnects.

Example 28 includes the subject matter of Example 27, and wherein allocating one or more of the plurality of the interconnects comprises allocating multiple of the plurality of interconnects, the method further comprising exposing, by the connection abstraction logic unit, to the workload, a single communication interface to utilize the allocated interconnects.

The invention claimed is:

1. An apparatus comprising:
   a connection circuitry configured to (i) determine a quality of service level target to be satisfied in execution of a workload that is to communicate with at least one other processor-executed workload through one or more interconnects of a plurality of interconnects; (ii) determine a quality of service property of at least one interconnect of the plurality of interconnects; (iii) allocate, based on the determined quality of service property of the at least one interconnect, one or more of the plurality of interconnects to the workload to satisfy the quality of service level target; (iv) determine a second quality of service level target to be satisfied in execution of a second workload that is to communicate with at least one second other processor-executed workload through one or more interconnects of the plurality of interconnects; and (v) allocate, based on the determined quality of service property of the at least one interconnect, one or more of the plurality of interconnects to the second workload to satisfy the second quality of service level target, wherein the quality of service level target and the second quality of service level target are independent of one another; and circuitry configured to communicate with the at least one other processor-executed workload through the allocated one or more of the plurality of interconnects.

2. The apparatus of claim 1, wherein the connection circuitry is further configured to allocate two or more of the plurality of interconnects and expose, to the workload, a single communication interface to utilize the allocated one or more of the plurality of interconnects.

3. The apparatus of claim 1, wherein the connection circuitry is further configured to receive a reference to a service level agreement (SLA) associated with the workload, wherein the SLA defines one or more quality of services targets.

4. The apparatus of claim 1, wherein the connection circuitry is further configured to determine the quality of service target based on an identity of the workload that is to be executed.

5. The apparatus of claim 1, wherein the connection circuitry is further configured to determine the quality of service level target based on a type of the workload that is to be executed.

6. The apparatus of claim 1, wherein the connection circuitry is further configured to determine at least one of a target latency, a target bandwidth, a target jitter, or a target monetary cost as the quality of service level target.

7. The apparatus of claim 1, wherein the connection circuitry is further configured to determine a quality of service level target for a workload that is to communicate with the at least one other processor-executed workload.

8. The apparatus of claim 1, wherein the connection circuitry is further configured to determine a quality of service level target for a workload that is to communicate with the at least one other processor-executed workload on another compute device.

9. The apparatus of claim 1, wherein the connection circuitry is further configured to determine one or more parameters of the at least one interconnect that are available to be set to reserve a quality of service for the workload.

10. The apparatus of claim 1, wherein the connection circuitry is further configured to determine a peak communication capability of the at least one interconnect.

11. The apparatus of claim 1, wherein the connection circuitry is further configured to determine at least one of a monetary cost to use the at least one interconnect, a bit error rate of the at least one interconnect, or a present utilization of the at least one interconnect.

12. The apparatus of claim 1, wherein the connection circuitry is further configured to determine a predicted utilization of the at least one interconnect over a predefined time period.

13. The apparatus of claim 1, wherein the connection circuitry is further configured to write a set of routing rules to a routing data structure that associates an identifier of the allocated one or more of the plurality of interconnects with an identifier of the workload.

14. The apparatus of claim 1, wherein the connection circuitry is further configured to configure the allocated one or more of the plurality of interconnects with one or more quality of service reservation parameters.

15. One or more non-transitory machine-readable storage media comprising a plurality of instructions stored thereon that, in response to being executed, cause a device to:

determine a quality of service level target to be satisfied in the execution of a workload that is to communicate with at least one other processor-executed workload through one or more interconnects of a plurality of interconnects associated with the device;

determine a quality of service property of at least one interconnect of the plurality of interconnects; and allocate, based on the determined quality of service property of the at least one interconnect, one or more of the plurality of interconnects to the processor-executed workload to satisfy the quality of service level target;

determine a second quality of service level target to be satisfied in execution of a second workload that is to communicate with at least one second other processor-executed workload through one or more interconnects of the plurality of interconnects; and allocate, based on the determined quality of service property of the at least one interconnect, one or more of the plurality of interconnects to the second workload to satisfy the second quality of service level target, wherein the quality of service level target and the second quality of service level target are independent of one another.

16. The one or more machine-readable storage media of claim 15, wherein the plurality of instructions further cause the device to allocate multiple of the plurality of interconnects and expose, to the workload, a single communication interface to utilize the allocated one or more interconnects.

17. The one or more machine-readable storage media of claim 15, wherein the plurality of instructions further cause the device to receive a reference to a service level agreement (SLA) associated with the workload, wherein the SLA defines one or more quality of services targets.

18. The one or more machine-readable storage media of claim 15, wherein the plurality of instructions further cause the device to determine the quality of service level target based on an identity of the workload that is to be executed.

19. The one or more machine-readable storage media of claim 15, wherein the plurality of instructions further cause the device to determine the quality of service level target basd on a type of the workload that is to be executed.

20. The one or more machine-readable storage media of claim 15, wherein the plurality of instructions further cause the device to determine at least one of a target latency, a target bandwidth, a target jitter, or a target monetary cost as the quality of service level target.

21. The one or more machine-readable storage media of claim 15, wherein the plurality of instructions further cause the device to determine a quality of service level target for a workload that is to communicate with the at least one other processor-executed workload.

22. The one or more machine-readable storage media of claim 15, wherein the plurality of instructions further cause the device to determine a quality of service level target for a workload that is to communicate with the at least one other processor-executed workload on another device.

23. The one or more machine-readable storage media of claim 15, wherein the plurality of instructions further cause the device to determine one or more parameters of the at least one interconnect that are available to be set by the device to reserve a quality of service for the workload.

24. The one or more machine-readable storage media of claim 15, wherein the plurality of instructions further cause the device to determine a peak communication capability of the at least one interconnect.

25. The one or more machine-readable storage media of claim 15, wherein the plurality of instructions further cause the device to determine at least one of a monetary cost to use the at least one interconnect, a bit error rate of the at least one interconnect, or a present utilization of the at least one interconnect.

26. A compute device comprising:
   circuitry for determining a quality of service level target to be satisfied in execution of a workload that is to communicate with at least one other processor-executed workload through one or more interconnects of a plurality of interconnects associated with the compute device;
   circuitry for determining a quality of service property of at least one interconnect of the plurality of interconnects;
   means for allocating, based on the determined quality of service property of the at least one interconnect, one or more of the plurality of interconnects to the workload to satisfy the quality of service level target;
   circuitry for determining a second quality of service level target to be satisfied in execution of a second processor-executed workload that is to communicate with at least one second other processor-executed workload through one or more interconnects of the plurality of interconnects; and
   circuitry for allocating, based on the determined quality of service property of the at least one interconnect, one or more of the plurality of interconnects to the second workload to satisfy the second quality of service level target, wherein the quality of service level target and the second quality of service level target are independent of one another; and
   circuitry for communicating with the at least one other processor-executed workload through the allocated one or more of the plurality of interconnects.

27. A method comprising:
   determining a quality of service level target to be satisfied in execution of a workload that is to communicate with at least one other processor-executed workload through one or more interconnects of a plurality of interconnects associated with a compute device;
   determining a quality of service property of at least one interconnect of the plurality of interconnects;
   allocating, based on the determined quality of service property of the at least one interconnect, one or more of the plurality of interconnects to the workload to satisfy the quality of service level target;
   determining a second quality of service level target to be satisfied in execution of a second workload that is to communicate with at least one second other processor-executed workload through one or more interconnects of the plurality of interconnects;
   allocating, based on the determined quality of service property of the at least one interconnect, one or more of the plurality of interconnects to the second workload to satisfy the second quality of service level target, wherein the quality of service level target and the second quality of service level target are independent of one another; and
   communicating with the at least one other processor-executed workload through the allocated one or more of the plurality of interconnects.

28. The method of claim 27, wherein allocating one or more of the plurality of the interconnects comprises allocating multiple of the plurality of interconnects, the method further comprising exposing to the workload, a single communication interface to utilize the allocated one or more of the plurality of interconnects.

29. An apparatus comprising:
   circuitry to allocate one or more interconnects of a plurality of interconnects for utilization by a workload based on a quality of service level target;
   circuitry to allocate one or more interconnects of the plurality of interconnects for utilization by a second workload based on a second quality of service level target, wherein the quality of service level target and the second quality of service level target are independent of one another and the one or more of interconnects of the plurality of interconnects comprise interconnects within a compute device and interconnects connected to the compute device; and
   circuitry configured to communicate with at least one other processor-executed workload through the allocated one or more interconnects.

30. The apparatus of claim 29, wherein the allocate one or more interconnects of a plurality of interconnects for utilization by a workload based on a quality of service level target is based on a service level target associated with the workload and a quality of service property of the one or more interconnects of the plurality of interconnects.

* * * * *